United States Patent [19]

Thibodeau et al.

[11] 3,863,184

[45] Jan. 28, 1975

[54] TELEVISION SCANNING LINEARITY DEVICE

[75] Inventors: Leslie Neil Thibodeau; Lawrence Edward Smith, both of Indianapolis, Ind.

[73] Assignee: RCA Corporation, New York, N.Y.

[22] Filed: May 16, 1974

[21] Appl. No.: 470,699

Related U.S. Application Data

[63] Continuation of Ser. No. 323,189, Jan., 1973, abandoned.

[52] U.S. Cl. .................... 336/110, 336/136, 310/15

[51] Int. Cl. .......................................... H01f 21/00

[58] Field of Search ........... 336/110, 136; 335/302, 335/234; 323/92

[56] References Cited

UNITED STATES PATENTS

| | | | |
|---|---|---|---|
| 2,612,541 | 9/1952 | Armond | 336/110 |
| 2,702,875 | 2/1955 | Bridges | 336/110 X |
| 2,869,088 | 1/1959 | Cushman | 336/110 |
| 2,959,747 | 11/1960 | Challacombe et al. | 310/15 X |

FOREIGN PATENTS OR APPLICATIONS

| | | | |
|---|---|---|---|
| 1,201,993 | 1/1960 | France | 336/110 |
| 739,515 | 11/1955 | Great Britain | 336/110 |

*Primary Examiner*—Thomas J. Kozma
*Attorney, Agent, or Firm*—Eugene M. Whitacre; Paul J. Rasmussen

[57] ABSTRACT

A television scanning linearity device comprises a coil wound around a coil form which has an internal recess along the length of the coil at right angles to the conductor turns. A ferrite core is disposed in the recess and a surface-magnetized permanent magnet is placed adjacent to the core within the recess, the magnetized surface being adjacent to the core for magnetically biasing the core such that scanning current of one polarity passed through the coil saturates the core whereas scanning current of the opposite polarity does not, the coil thereby presenting a nonlinear inductance for linearizing the television scanning.

5 Claims, 7 Drawing Figures

TELEVISION SCANNING LINEARITY DEVICE

This is a continuation, of application Ser. No. 323,189, filed Jan. 12, 1973 now abandoned.

BACKGROUND OF THE INVENTION

This invention relates to a television scan linearity correcting device.

In a television receiver, it is desirable that the scanned raster presented to the viewer is linear such that reproduced scenes will not be unsatisfactorily compressed or extended at one side of the raster relative to the other. Scanning nonlinearities can arise from the geometrical aspects of the picture tube as well as in the electrical scanning circuits. While care can be taken to insure that the generated scanning waveforms applied to the horizontal deflection circuitry would result in a linear scan, the resistance of various components in the circuit such as the resistance of the deflection coils, the flyback transformer and drive devices such as transistors and diodes, result in nonlinearities being undesirably added to the scanning current.

There are a number of approaches to correcting the nonlinearities of the scanning current. For example, the voltages in the horizontal output scanning circuit may be modulated to effect linearity correction or the scanning current may be corrected for producing a linear display by passing this current through a nonlinear device. It is to this latter approach that the present invention is directed.

A typical nonlinear device for correcting scanning current as known in the art usually includes a coil placed in circuit with the horizontal deflection coils. The linearity correction coil is usually wound around a ferrite core which may be biased by a permanent magnet arrangement. These devices usually include means for adjusting the position of a magnet or magnets disposed away from the core to control the amount of biasing magnetic flux coupled to the core. While such arrangements can be made to perform satisfactorily, the coil structure with its associated ferrite core and permanent magnet assemblies are generally complicated in a mechanical construction sense and are thereby relatively expensive. Additionally, these arrangements using one or more magnets located away from the ferrite core require relatively large magnets to couple the desired biasing flux to the core such that the core will saturate in response to one polarity of scanning current and not saturate in response to scanning current of the opposite polarity to present in the linearity coil a nonlinear inductance to correct the scanning current passing therethrough.

An object of this invention is to provide an improved induction coil apparatus for presenting a nonlinear inductance to the deflection coil waveform.

In accordance with a preferred embodiment of the invention, the nonlinear induction coil apparatus comprises a coil wound about an outer surface of a coil winding form. The form includes a recess extending within the form along the length of the coil form. Disposed within the recess is a magnetically permeable core member and a permanent magnet mounted adjacent to the core. The permanent magnet is surface magnetized with its magnetized surface being adjacent to the core.

In one embodiment of the invention, the core and magnet assembly are arranged to be slideably adjustable within the coil form to adjust the amount of inductance of the coil.

A more detailed description is given in the following description and accompanying drawing of which:

DESCRIPTION OF A PREFERRED EMBODIMENT OF THE INVENTION

Figure 1:
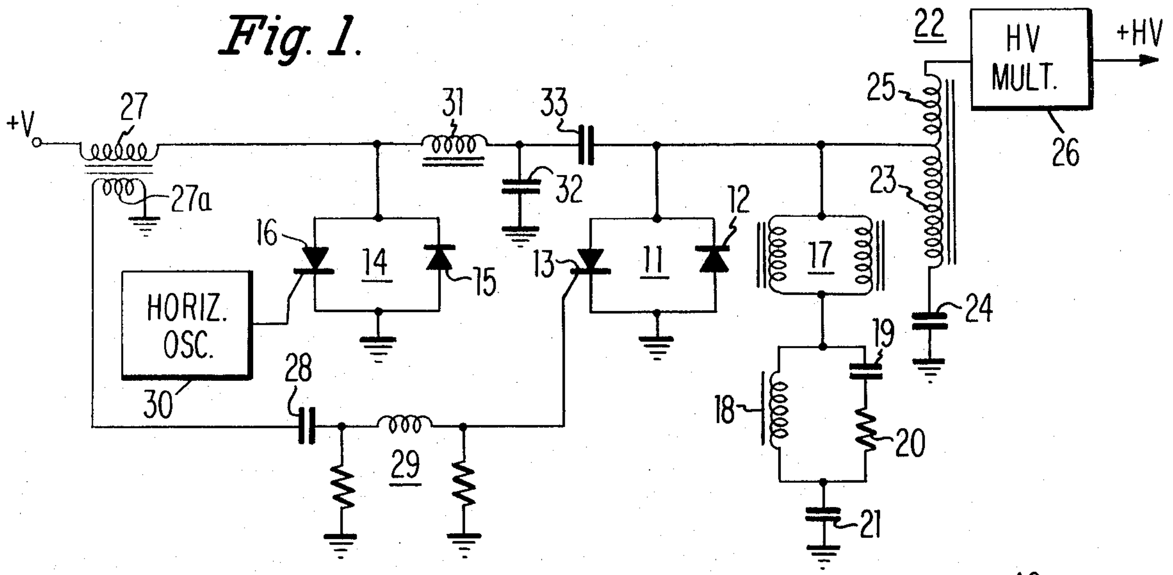
FIG. 1 is a schematic diagram of a television deflection circuit embodying a linearity correction coil in accordance with the invention.

FIG. 1 is a schematic diagram of a television deflection circuit embodying a linearity correction coil in accordance with the invention. With the exception of the linearity coil, to be described subsequently, the deflection circuit illustrated is similar to the deflection circuit described in U.S. Pat. No. 3,452,244, entitled "ELECTRON BEAM DEFLECTION AND HIGH VOLTAGE GENERATION CIRCUIT" and granted to Wolfgang F. W. Dietz. This circuit includes a bidirectional conducting trace switch 11 including a diode 12 and an SCR 13 for conducting deflection current during the trace portion of a horizontal deflection scanning interval. A bidirectional deflection commutating switch 14 includes a diode 15 and an SCR 16. The commutating switch conducts current during at least the retrace portion of each horizontal scanning interval. Coupled to trace switch 11 is a pair of horizontal deflection coils 17 serially coupled to an S-shaping capacitor 21 by a linearity correction circuit comprising a linearity coil 18 in parallel with a series-connected capacitor 19 and a resistor 20. The trace switch 11 is also coupled to a primary winding 23 of a horizontal output transformer 22, the other end of primary winding 23 being coupled through a DC blocking capacitor 24 to ground. Trace switch 11 is further coupled to a tertiary winding 25 of transformer 22, which tertiary winding steps up the retrace voltage pulse, which pulse is then coupled to a high voltage multiplier and rectifier assembly 26 wherein it is rectified for supplying the high voltage ultor potential for the television picture tube.

The horizontal deflection circuit in FIG. 1 is energized by a source of potential +V coupled through a relatively large inductor 27 to the junction of diode 15 and SCR 16 of the commutating switch 14. This junction is also coupled to one side of a commutating coil 31, the other side of which is coupled to a wave-shaping capacitor 32 and a retrace capacitor 33. A winding **27*a* of inductance 27 is coupled through a capacitor 28 to a trigger-shaping network 29 to the gate electrode of SCR 13. A horizontal oscillator 30 supplying pulses at the horizontal scanning rate is coupled to the gate electrode of commutating SCR 16.**

Figure 3:
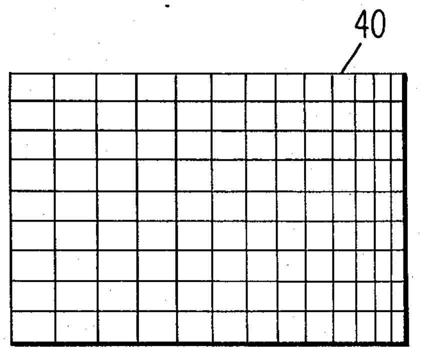
FIG. 3 illustrates a line pattern on a scanned raster showing the effects of scanning nonlinearity.

The operation of the circuit of FIG. 1 will be described briefly in relation to the horizontal scanning current waveform 42 illustrated in FIG. 3. At the beginning $T_1$ of the horizontal scanning interval, deflection current is conducted through diode 12 of the trace switch 11, the deflection coil 17 and the linearity circuit to positively charge capacitor 21. This deflection current gradually decreases until it reaches zero at time $T_2$, at which point the deflection current reverses and capacitor 21 now supplies current through the linearity circuit, the deflection winding 17 and trace SCR 13. Diode 12 is nonconducting at this time.

Just prior to time $T_0$, a pulse from horizontal oscillator 30 causes SCR 16 of the commutating switch 14 to conduct. This initiates the commutating operation of switches 11 and 14 and, at $T_0$, initiates the retrace portion of the deflection interval. During the retrace interval energy stored in capacitors 32 and 33 is transferred to the deflection windings 17 and the high voltage circuitry to replace the energy dissipated due to the resistance of the components during the trace interval. During the retrace interval a resonant half-cycle exchange of energy takes place between inductor 31, capacitors 32 and 33, transformer 22 and the deflection coil 17. The diode 15 conducts during the portion of the retrace interval when the deflection current reverses. The abrupt decrease of current in the deflection coils during the retrace interval causes the flyback pulse to be generated in the deflection windings, which pulse is stepped up by tertiary winding 25 of transformer 22 to supply the high voltage for the picture tube ultor electrode. When retrace capacitor 33 has discharged sufficiently, trace diode 12 starts to conduct as described above and the first half of the trace interval begins. During the trace interval capacitors 32 and 33 are charged positively from the +V supply through inductor 27 and commutating coil 31.

Due to the different resistances in the deflection circuit during the first and second portions of the trace interval, including the different resistances of SCR 13 and diode 12, the linearity of the deflection current through deflection coil 17 is altered at the beginning of the trace interval relative to the end of the trace interval. Also, the opposite polarity currents passing through SCR 13 and diode 12 produce opposite polarity voltage drops across these different resistances which respectively add to and subtract from the yoke voltage, thereby distorting the desired slightly exponential scanning current waveform which corrects for the earlier-mentioned geometrical caused nonlinearity.

It is the purpose of the linearity circuit including linearity coil 18, capacitor 19 and resistor 20 to correct for this nonlinearity.

Figure 2:
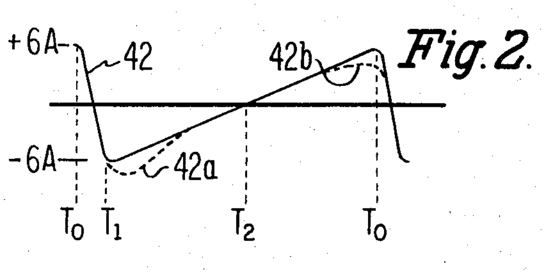
FIG. 2 illustrates a deflection yoke current waveform exhibiting nonlinearity.

In FIG. 2 scanning current waveform 42 indicated by the solid line is the desired normalized linear raster producing scanning current waveform. It should be noted that the slightly exponential shape of the scanning current waveform, produced by the S-shaping capacitor 21 for correcting for geometrical nonlinearity, has been omitted. The effect of the different resistances in the circuit as described above are illustrated by the dotted portions **42*a* and 42*b* of waveform 42. Whereas the desired scanning current through deflection coils 17 would have a range of from −6 amperes to +6 amperes, the nonlinearities change this such that the peak negative current is more negative and the peak positive current is less positive. The effect of this nonlinearity of the deflection coil current is illustrated by the crosshatch pattern on the raster 40** of FIG. 3. It can be seen that the separation between vertical lines on the left-hand side of the raster is greater than the separation of the vertical lines on the right-hand side of the raster. Although most clearly illustrated by means of a crosshatch pattern, the effect on a reproduced scene would be similar: extension of the display on the left of the raster and compression of the scene on the right-hand side.

Linearity coil 18 of FIG. 1, in conjunction with capacitor 19 and resistor 20, itself presents a non-linear inductance to the scanning current such that when the circuit is traversed by the scanning current, the current through the deflection coils is shaped such as to produce a linear raster. This correction is brought about by placing a ferrite core within the turns of coil 18 and magnetically biasing the core such that the core saturates during the peak positive portion of the deflection cycle, whereas it does not saturate during the negative polarity current portion of the deflection cycle. This is caused by the permanent magnet biasing flux adding to the flux resulting from scanning current of one polarity and subtracting from the flux generated by scanning current of the other polarity. when the core saturates, the inductance of the coil 18 decreases, lowering the impedance of the circuit and thereby allowing the current to rise. During the negative current portion of the cycle, the core is unsaturated and the increased inductance of the linearity coil presents a higher impedance to the scanning current, thereby decreasing the current flowing through the deflection coils. In FIG. 1 the nominal inductance presented by the deflection coils is in the order of 150 microhenries. The inductance range of the linearity coil 18 is selected such that its minimum inductance for the peak positive current is about 22 microhenries and its maximum inductance presented to the peak negative scanning current is about 58 microhenries. As the linearity coil 18 is in series with the deflection coil 17, it can be seen that the varying inductance and impedance of the linearity coil affects the scanning current which passes through the deflection coil 17. Capacitor 19 and resistor 20 in parallel with coil 18 form a resonant circuit to reduce ringing of the linearity circuit.

Figure 4:
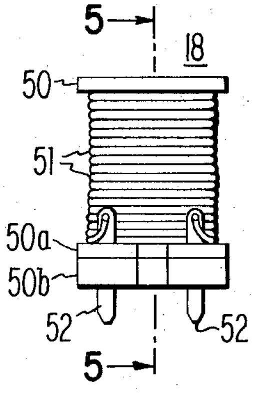
FIG. 4 illustrates a linearity coil embodying the invention.

FIG. 4 illustrates a linearity coil, referred to as coil 18 in FIG. 1, embodying the invention. In FIG. 4 the coil 18 comprises a plurality of conductor turns 51 wound about a coil form 50. Coil form 50 includes a bottom member **50*a* and additional members 50*b* providing a mounting surface for the coil to be mounted on a chassis. Terminals 52 are mounted in members 50*b*** and serve to make electrical connections to the coil as well as to provide a mounting means on a circuit board in the chassis. To provide the inductance range specified above, the conductor turns comprise 57 turns of 60 strand No. 36 wire.

Figure 5:
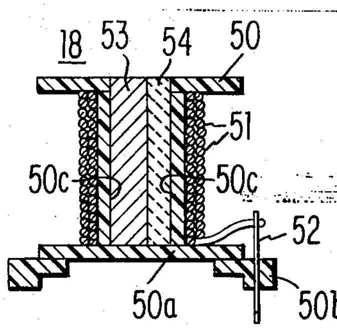
FIG. 5 is a cross-sectional view of the coil of FIG. 4.

A main feature of the invention is more clearly illustrated in FIG. 5, which is a cross-sectional view of a coil illustrated in FIG. 4. The vertical members **50*c* of coil form 50 define a rectangular recess within the form extending the length of the coil winding at right angles to the conductor 51 turns. Within this recess is disposed a saturable ferrite core member 54 and adjacent to it a permanent magnet 53. The coil form may be designed such that there is a press fit of a combination of core 54 and magnet 53** within the recess. Of course, it is to be understood that the magnet-core combination may be fixedly held within the recess by other means such as a bonding material like epoxy.

Figure 6:
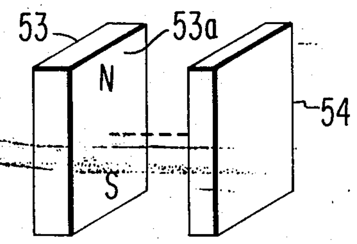
FIG. 6 illustrates the permanent magnet and ferrite core of the coil of FIG. 4.

FIG. 6 illustrates the magnet-core combination of coil 18 illustrated in FIGS. 4 and 5. The magnet 53 is shown separated from ferrite core member 54 to illustrate the magnetic pole location of the magnet. The magnet 53, which may be of barium ferrite, for example, is surface magnetized such that the north and sourth poles are located on the surface 53*a* which abuts the ferrite core 54. With this arrangement the external magnetic field of stray flux is reduced and there is a more efficient utilization of a given strength magnet to induce flux in the core member 54. With this efficient utilization of the magnet and core combination, a smaller magnet may be used compared to the prior art arrangements in which the biasing magnet or magnets were placed external to the coil form. Also, this arrangement permits the use of a smaller and less expensive ferrite core member.

The proper combination of magnet, core and coil conductor turns can usually be readily determined by a particular circuit such that the assembly can be made fixed as shown in FIGS. 4 and 5, thereby reducing the cost of the assembly because no adjustable components are required. However, the advantages of the invention including the combination of a surface-magnetized magnet placed adjacent a core member may also be utilized to provide an adjustable linearity coil as illustrated in FIG. 7.

Figure 7:
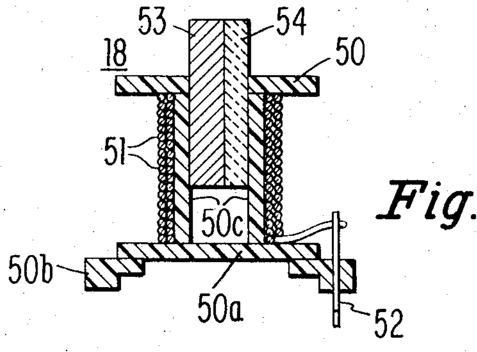
FIG. 7 is a cross-sectional view of another embodiment of a linearity coil in accordance with the invention.

FIG. 7 illustrates how the basic structure of the coil assembly shown in FIGS. 4 and 5 may be used to provide an adjustable coil. The combination of magnet 53 and core member 54 may be adjusted in position with regard to the distance the combination is inserted in the recess formed by the core member sides 50*c*. By moving the magnet-core combination along this recess, the range of inductances of the unit may be varied. Once the desired operating parameter has been achieved, the magnet-core combination may be fixed in position as described above by any suitable means such as designing the coil form 50 such that the recess is small enough to fixedly retain the magnet and core. Also, the magnet-core combination may be fixedly in place after adjustment by the application of a suitable bonding agent such as epoxy.

What is claimed is:

1. An electromagnetic coil assembly for providing different inductances to current of different polarity passing through said coil, comprising:

a coil form member of nonmagnetic material comprising a shell, the outer surface of which is adapted to have a coil wound thereon and the inner surface of which forms a recess;

a coil wound about said outer surface of said shell;

a generally rectangular magnetically saturable ferrite core member disposed within said recess; and a generally rectangular ferrite permanent magnet mounted adjacent to said core member within said recess, said magnet being magnetized only on its surface disposed adjacent to said core with a single different pole at each end of the length of said magnet for magnetically biasing said core such that the flux generated in said core by said magnet opposes the flux generated in said core by current of a first polarity passing through said coil and said flux generated by said magnet aids the flux generated in said core by current of a second polarity passing through said coil for saturating said core, thereby providing different inductances in said coil for the same amount of current of said first and second polarities.

2. An electromagnetic coil assembly according to claim 1 wherein said core and said magnet extend within said recess substantially the full length of said coil.

3. An electromagnetic coil assembly according to claim 1 wherein said core and said magnet extend within said recess for a length less than the full length of said coil.

4. An electromagnetic coil assembly according to claim 2 wherein said magnet is made of barium ferrite.

5. An electromagnetic coil assembly according to claim 3 wherein said core and said magnet are slideably adjustable within said recess of said shell for adjusting the inductance of said coil.

* * * * *